Oct. 12, 1926.
I. M. CLARKE
1,603,025
METHOD OF MOLDING GLASS AND APPARATUS THEREFOR
Filed June 7, 1926    2 Sheets-Sheet 1
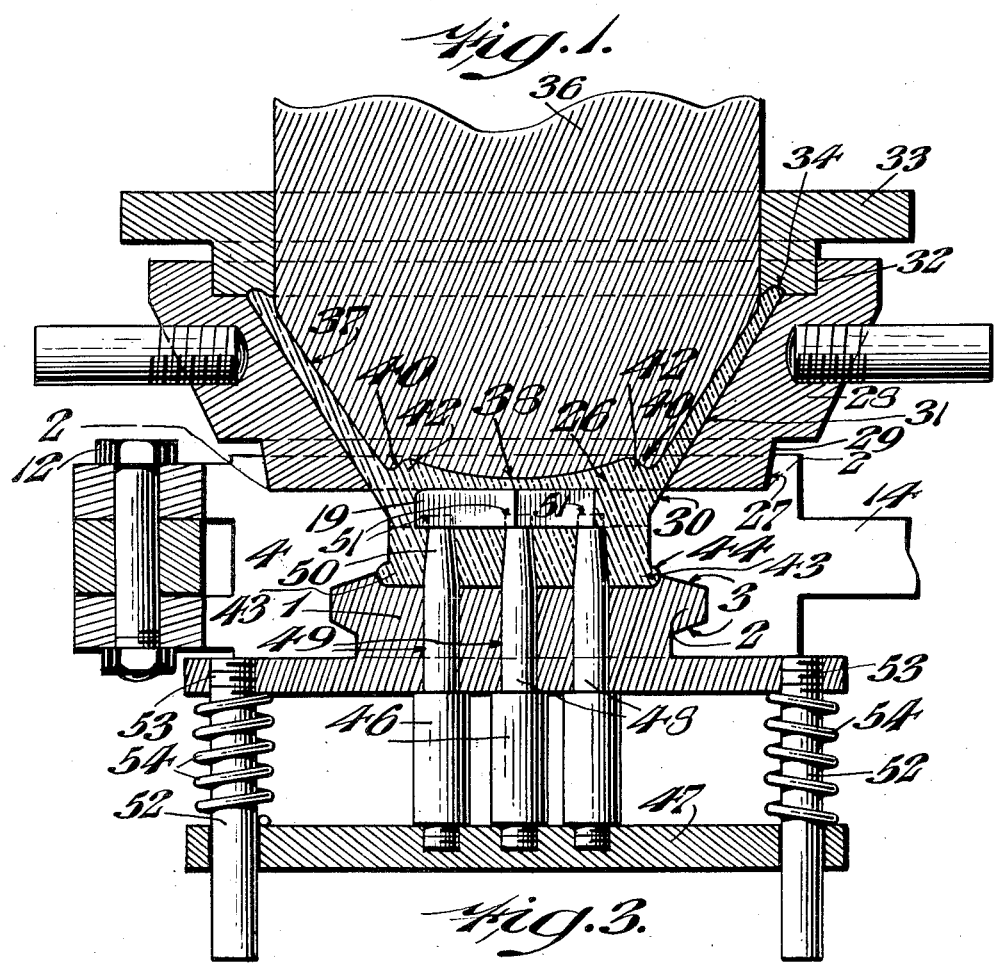
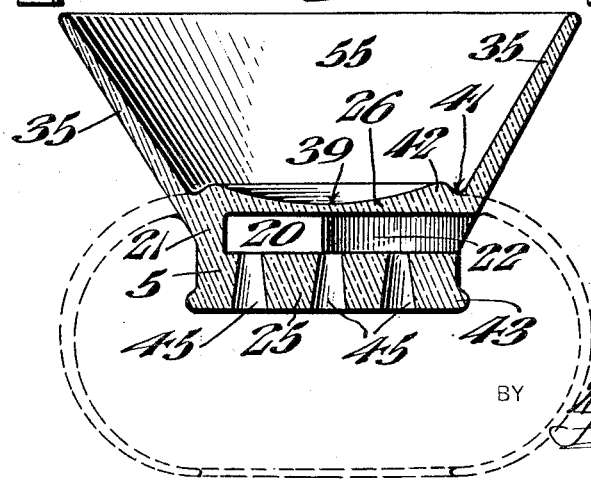
INVENTOR:
IRA M. CLARKE,
BY
ATTORNEYS.

Oct. 12, 1926.  
I. M. CLARKE  
1,603,025
METHOD OF MOLDING GLASS AND APPARATUS THEREFOR
Filed June 7, 1926  2 Sheets-Sheet 2
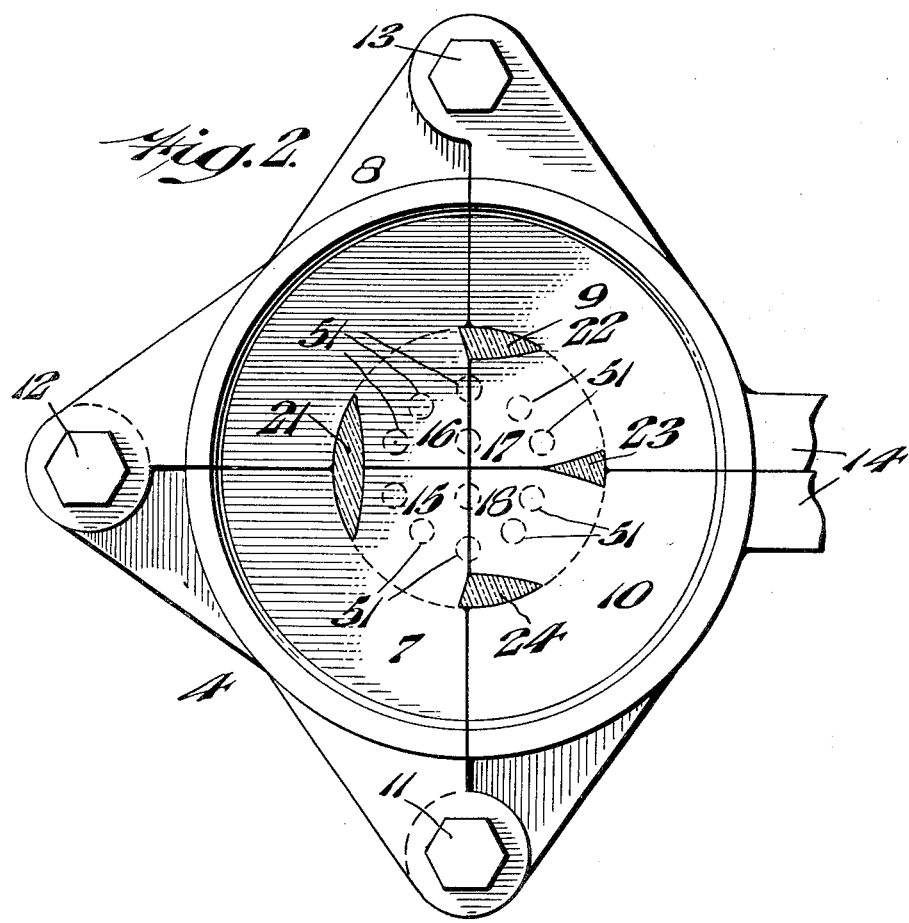
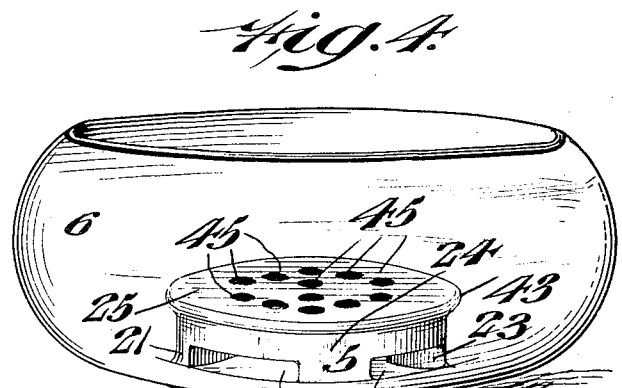
INVENTOR:
IRA M. CLARKE,
BY
ATTORNEYS.

Patented Oct. 12, 1926.

1,603,025

UNITED STATES PATENT OFFICE.

IRA M. CLARKE, OF NEW MARTINSVILLE, WEST VIRGINIA, ASSIGNOR TO NEW MARTINSVILLE GLASS MFG. CO., OF NEW MARTINSVILLE, WEST VIRGINIA, A CORPORATION OF WEST VIRGINIA.

METHOD OF MOLDING GLASS AND APPARATUS THEREFOR.

Application filed June 7, 1926. Serial No. 114,098.

My invention relates to a new and useful improvement in molding glass, and it relates more particularly to a novel method of molding, as well as novel apparatus and mold construction for carrying out my novel method of molding.

My invention relates more particularly to a novel method and mold, for molding a glass bowl, having inwardly overhanging walls and an upwardly projecting substantially hollow central member, molded integrally with the bottom of the bowl; the upper wall of said central member being perforated.

The particular object to be molded in this instance is a flower bowl having a curved wall extending upwardly and inwardly towards the center, and having a central flower supporting member molded integrally with the bottom of the wall and projecting upwardly within the bowl, said flower supporting member having an upper perforated wall or disc, and having a hollow interconnecting chamber below said upper perforated wall or disc, and intermediate of said wall and the bottom of the bowl, interconnecting the several perforations in said upper wall of the flower supporting member.

With the above ends in view my invention consists of forming a glass bowl of the character stated, by first molding a bowl blank, including the central flower supporting member having the upper perforated wall or disc and the hollow intercommunicating chamber intermediate said wall and the bottom of the bowl, with the walls of the bowl blank diverging however, from the bottom thereof in a direction opposite to the direction of the flower supporting member, and opposed to the direction of said walls in the finished bowl, so that the flower supporting member is disposed without the bowl blank, instead of within the bowl, as in the finished product.

My invention further consists in applying heat to the diverging walls of the bowl blank thus molded, while the same is suitably supported, preferably by gripping the flower supporting member, and allowing the heated and plastic walls of the bowl blank to gravitate downwardly, and reshaping them while in the plastic condition, until said walls extend in the opposite direction and thus enclose within them the flower supporting member.

My invention further consists of novel press mold construction, whereby a bowl blank of this type, may be quickly molded. Thus a mold of my invention consists of a suitable base plate, having a central aligning and retaining flange, a joint mold hingedly mounted upon said base plate and preferably formed in quarters, for molding the outer circumference of the flower supporting member; each of the quarters of said joint mold carrying a corresponding section of a central core, whereby the intercommunicating chamber beneath the flower supporting member is formed.

The mold of my novel construction further includes a series of spaced plugs extending through suitable apertures in the base plate, rigidly carried by a lower spring plate and having their upper ends terminating in the core sections carried by the joint mold.

The mold of my novel construction further includes a solid shell having upwardly and outwardly diverging conical walls, for molding the wall of the bowl blank and a suitable plunger adapted to descend down into said shell, for forming the thickness of said wall of the bowl blank as well as for shaping the bottom thereof.

For the purpose of illustrating my invention, I show in the accompanying drawings, forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a vertical section of a mold of my novel construction.

Figure 2 represents a horizontal section on line 2—2 of Figure 1.

Figure 3 represents a similar vertical section of molded bowl blank, after it is removed from the mold, and prior to the reversal and reshaping of the wall thereof, in a manner indicated in dotted lines in said figure.

Figure 4 represents a perspective view of the completed bowl, after the wall thereof has been reversed and reshaped.

Referring to the drawings, in which like reference characters indicate like parts, 1 designates the base plate of a mold of my novel construction, having a suitable circular aligning flange 2 thereon, of a suitable shape, and preferably having the inclined surfaces 3, whereby the joint mold members may be more perfectly secured and aligned. Upon the base plate 1 is mounted the joint mold 4, formed in quarters, as shown in Figure 2 and adapted to mold the generally cylindrical flower supporting member 5, of the bowl 6 (Figure 4).

The joint mold 4 is formed in four quarter sections 7, 8, 9, and 10 respectively, each of the sections being hinged to the adjacent section by the hinge bolts 11, 12 and 13 respectively, as shown particularly in Figures 1 and 2; and the sections 9 and 10 having suitable means 14, for detachably securing the two in the closed relation to each other, in the position shown in Figure 2.

Thus, upon opening the joint mold 4, by the handles or lugs 14, the two sections 9 and 10 are first swung open, about the pivot bolts 13 and 11 respectively, and finally the sections 7 and 8 are swung outwardly about the common pivot bolt 12.

The sections 7, 8, 9 and 10, carry corresponding laterally and inwardly projecting quarter sections or portions 15, 16, 17 and 18, of a central core 19, whereby the intercommunicating chamber 20 of the flower supporting member 5 is formed. While the core sections 15, 16, 17 and 18 are so proportioned as to form one complete core disc when closed, they are provided with arcuate edges, formed about their corresponding pivot bolts as centers, so that when such core sections 15, 16, 17 and 18 are withdrawn, together with the corresponding joint mold sections, they will recede from the flower supporting member 5, so as to leave behind interconnecting glass webs 21, 22, 23 and 24, intermediate the upper wall or disc 25 of the flower supporting member 5 and the bottom wall 26 of the molded glass bowl blank (shown in Figure 3).

The joint mold 4 is provided with a suitable circular recess 27, having a slightly diverging or inclined wall, in which is seated an upper solid mold shell 28, having a correspondingly tapered or inclined lower outer circular portion 29, adapted to seat in said recess 27, thereby properly and accurately to align the inner conical mold surfaces 30 and 31 of the joint mold 4 and the solid mold shell 28 respectively. The shell 28 is in turn provided with an upper circular recess 32, in which is seated the upper ring 33, which forms the terminal edge 34, of the wall 35, of the glass bowl blank. A press plunger 36, carried by suitable press mechanism, (not shown in the drawings) is adapted to pass through the ring 33, fitting snugly therein, and is provided with a lower conical surface 37, which coacts with the corresponding conical surface 31 of the mold shell 28, to form therebetween the conical wall 35, of the bowl blank, of a suitable thickness. The lower terminal surface 38 of the press plunger 36, is in turn convexed downwardly, so as to produce the concaved bottom surface 39 on the bowl blank. A downwardly projecting bead 40 is provided surrounding the lower convexed terminal surface 38, and merging into the conical wall surface 37 of said plunger, so as to form an annular depression 41, in the glass bowl blank between the concaved bottom surface 39, and the wall 35 of said bowl blank, and thus forming a corresponding annular basal bead 42, on the bottom of the finished bowl.

A laterally and outwardly projecting annular bead 43 is also formed on the upper edge of the flower supporting member 5, by a corresponding annular groove or recess 44 formed partly in the base plate 1 and partly in the joint mold 4.

In order to provide a series of suitable vertical apertures 45, in the upper wall or disc 25, of the flower supporting member 5, for the reception of the stems of the flower to be contained and supported within the bowl, a series of plugs 46 are provided, rigidly secured in a lower spring plate 47, and having upper reduced portions 48 extending through suitable apertures 49 in the base plate 1, and having slightly tapered upper terminal portions 50, the upper ends of which are adapted to seat in a corresponding and aligned series of recesses 51 in the core sections 15, 16, 17 and 18, as shown in Figures 1 and 2.

The spring plate 47 is guided on a plurality of suitable guide rods 52, which are rigidly secured at their upper ends 53 in the base plate 1, and is urged downwardly with respect to the mold, by a corresponding plurality of helical compression springs 54, surrounding said guide rods 52, and interposed between the base plate 1 and said spring plate 47.

In carrying out my novel method, the joint mold 4 is closed in, about the base plate 1, in a position shown in Figure 2, with the shell 28 and the ring 33 suitably positioned thereon, and with the mold in a raised or upper position with respect to the spring plate 47, and hence with the plugs 46 in a retracted position with respect to the mold. In this condition, a gob of hot plastic glass, of suitable amount, is dropped into the mold. Then the plunger 36, actuated by suitable press mechanism (not shown in the drawings), is brought down through the ring 33, onto the gob of plastic glass. The force of the plunger 36 depresses the entire mold structure, together with the base plate 1, thereby forcing the said base plate downwardly towards the spring plate 47, and thereby causing the plugs 46 to project into the mold, seating their upper terminals 50 in the corresponding recess 51 of the core sections 15, 16, 17 and 18.

The plunger 36 thus not only shapes the glass into the mold, but also causes the entrance into the mold of the tapered ends 50, of the plugs 46, so as to form a corresponding series of apertures or perforations 45, in the upper wall or disc 25, of the flower supporting member 5.

Upon withdrawing the plunger 36, in an upward direction, the springs 54 raise the mold structure into the upper position with respect to the spring plate 47, and thus cause the tapered ends 50 of the plugs 46, to be instantly retracted from the body of glass, leaving behind a corresponding series of slightly tapered holes 45. The joint mold 4 is then opened up; the members 9 and 10 being opened first and the members 7 and 8 being subsequently swung open, thereby successively withdrawing, in a lateral direction, the core sections 17 and 18, and 15 and 16 respectively, and thereby leaving behind the intercommunicating chamber 20, in the flower supporting member 5, intermediate of the upper wall or disc 25 and the bottom 26 of the bowl. The ring 33 is then removed, and the molded bowl blank 55 (Figure 3) is then removed in an upward direction from the solid mold shell 28.

The bowl blank 55 thus molded, is then in the shape shown in Figure 3 in solid lines. In this condition it is grasped by suitable means at the member 5 thereof, and the frustrated conical wall 35 thereof is reheated until it becomes sufficiently plastic. In this plastic condition of the wall 35, it is reversed, or turned inside out, and reshaped in the form indicated in dotted lines in Figure 3 and shown more specifically in Figure 4, thereby enclosing the flower supporting member 5 within the bowl.

Having thus described my invention, what I claim as new and desire to secure by Letters Patent is:—

1. The method of molding a bowl of the character stated, which consists in molding a bowl blank having a frustrated conical wall, a bottom wall and a hollow cylindrical member formed integral with the bottom wall and extending in a direction opposite to the direction of the frustrated conical wall, applying heat to the frustrated conical wall of said blank thereby plasticizing the same and lastly reversing the conical wall while in a plastic condition so as to cause said frustrated conical wall to surround said hollow cylindrical member.

2. The method of molding a bowl of the character stated, which consists in molding glass in a plastic state around a central core and a series of spaced plugs at a right angle to said core, therewith forming an upper frustrated conical wall and a lower cylindrical member, withdrawing the series of spaced plugs thereby to leave behind a corresponding series of upright apertures in said cylindrical member, and withdrawing the central core member at a right angle to the direction of withdrawal of the plugs, thereby to leave behind a central inner chamber common to and interconnecting the upright apertures.

3. The method of molding a bowl of the character stated, which consists in molding glass in a plastic state around a central core and a series of spaced plugs at a right angle to said core, therewith forming an upper frustrated conical wall and a lower cylindrical member, withdrawing the series of spaced plugs thereby to leave behind a corresponding series of upright apertures in said cylindrical member, withdrawing the central core member at a right angle to the direction of withdrawal of the plugs, thereby to leave behind a central inner chamber common to and interconnecting the upright apertures, removing the blank from the mold and lastly reversing the frustrated conical wall while in a plastic condition, so as to dispose the same in the opposite direction from the direction in which it was molded, so as to cause the same to surround said cylindrical member.

4. In a mold of the character stated, a base plate, a joint mold mounted upon said base plate, core sections carried by said joint mold and extending inwardly to form a central hollow chamber, movable upright plugs extending through the base plate and connecting with said core section, and means normally to retain said plugs in a retracted position.

5. In a mold of the character stated, a base plate, a joint mold mounted thereon, a mold shell superimposed upon said joint mold and having suitable means common thereto and to said joint mold for interlocking the two in operative alignment with each other, inner central core sections carried by sections of said joint mold and having lower opposed recesses for the reception of the upper terminals of core plugs, movable upright core plugs extending through the said base plate and having their terminals in operative alignment with said recesses in the core sections, yieldable means normally to retain said plugs in a retracted position and an upright press plunger adapted to project down into the mold shell, to cooperate therewith to form a conical wall and adapted to force the movable plugs into an inner operative position simultaneously with the molding operation.

6. In a mold of the character stated, a base plate, a spring plate positioned below the same, means to guide said base plate in vertical parallelism with respect to said spring plate, resilient means yieldably to retain said base plate in an upper position, a four section joint mold mounted upon said base plate having an inner cylindrical molding surface, a molding shell superimposed upon said joint mold and having means common to it and said joint mold for locking the latter in operative alignment with the former, said shell having an inner upwardly divergent conical surface, an upper terminal ring superimposed upon said shell, inwardly and laterally extending core sections carried by each of the sections of said joint mold, adapted to form a single inner hollow chamber within the cylindrical mold of said joint mold, each of said core sections having suitable spaced recesses in the lower surfaces thereof, a series of spaced upright core plugs carried by said spring plate and extending through the base plate, in vertical alignment with the recesses in said core sections, and adapted to have their upper terminals seated in said recesses when said plugs are projected upwardly into the mold and an upper press plunger adapted to project downwardly into the mold shell to form a conical molded glass wall in said mold shell and to depress said mold thereby to force the core plugs into an inner operative position within said mold.

IRA M. CLARKE.